United States Patent
Martens

(10) Patent No.: US 12,428,246 B2
(45) Date of Patent: Sep. 30, 2025

(54) APPARATUS FOR WORKING AND HOMOGENIZING OF A MASS OF LOOSE OR INCOHERENT MATERIAL AND THE METHOD OF OPERATING OF THAT APPARATUS

(71) Applicant: Macondo B.V., Doetinchem (NL)

(72) Inventor: Jozef Andreas Maria Martens, Doetinchem (NL)

(73) Assignee: Macondo B.V., Doetinchem (NL)

( * ) Notice: Subject to any disclaimer, the term of this patent is extended or adjusted under 35 U.S.C. 154(b) by 1032 days.

(21) Appl. No.: 17/599,334

(22) PCT Filed: Mar. 23, 2020

(86) PCT No.: PCT/NL2020/050194
§ 371 (c)(1),
(2) Date: Sep. 28, 2021

(87) PCT Pub. No.: WO2020/204702
PCT Pub. Date: Oct. 8, 2020

(65) Prior Publication Data
US 2022/0162019 A1 May 26, 2022

(30) Foreign Application Priority Data
Apr. 4, 2019 (NL) .................................... 2022866

(51) Int. Cl.
*B65G 65/28* (2006.01)
*B01F 33/502* (2022.01)
(Continued)

(52) U.S. Cl.
CPC .......... *B65G 65/28* (2013.01); *B01F 33/5022* (2022.01); *B09B 1/00* (2013.01); *B65G 65/12* (2013.01); *B65G 2201/04* (2013.01)

(58) Field of Classification Search
CPC .... B65G 65/28; B65G 65/12; B65G 2201/04; B01F 33/5022; B09B 1/00; C05F 17/971; C05F 17/939; C05F 17/964
(Continued)

(56) References Cited

U.S. PATENT DOCUMENTS 5,387,036 A * 2/1995 Hagen .................. C05F 17/939
366/345
5,405,780 A 4/1995 Hamilton, Jr.
(Continued)

FOREIGN PATENT DOCUMENTS

EP 0882390 B1 10/2002
JP 2001302380 A 10/2001
(Continued)

*Primary Examiner* — Michael L Hobbs
(74) *Attorney, Agent, or Firm* — The Webb Law Firm

(57) ABSTRACT

The invention relates to an apparatus for processing and mixing and thus homogenizing of a mass loos or incoherent material and comprises at least one trench silo provided with an inlet opening which is divided in compartments in longitudinal direction. The top layer is scraped from a stack of material present in a compartment by a scraper and deposited in the next compartment. This scraping operation is repeated until the previous compartment is completely empty. After a compartment has thus been completely filled, the material present therein is given the opportunity to be processed. A fully emptied compartment is filled again with material from a previous compartment. The material present in the end compartment, after being processed, is removed by a discharge conveyor belt. The invention also focuses on the operation of such a device.

14 Claims, 10 Drawing Sheets

(51) Int. Cl.
　　　*B09B 1/00*　　　(2006.01)
　　　*B65G 65/12*　　(2006.01)
(58) Field of Classification Search
　　　USPC .......................................... 435/290.1–290.4
　　　See application file for complete search history.

(56) References Cited

U.S. PATENT DOCUMENTS

| | | | | |
|---|---|---|---|---|
| 5,434,080 | A | * | 7/1995 | Schmutz ............... C05F 17/964 435/819 |
| 7,135,332 | B2 | * | 11/2006 | Ouellette ............... C05F 17/60 165/104.21 |
| 2010/0285556 | A1 | * | 11/2010 | Feldmann .............. C12M 21/04 435/290.4 |
| 2013/0206071 | A1 | | 8/2013 | Caprio et al. |

FOREIGN PATENT DOCUMENTS

| | | | |
|---|---|---|---|
| JP | 2003335594 | A | 11/2003 |
| JP | 200676813 | A | 3/2006 |
| JP | 201939809 | A | 3/2019 |
| WO | 2012029041 | A2 | 3/2012 |

* cited by examiner

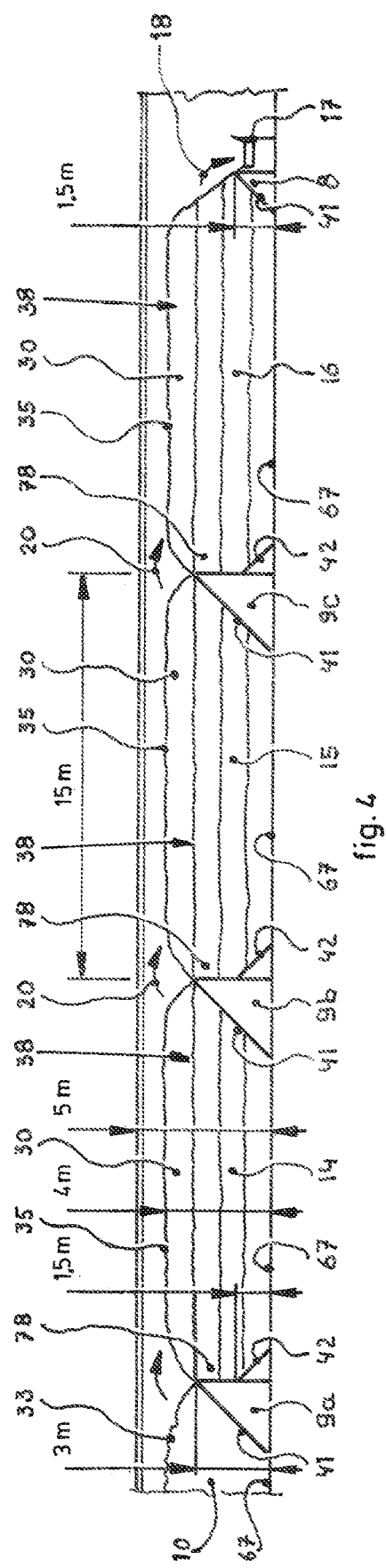
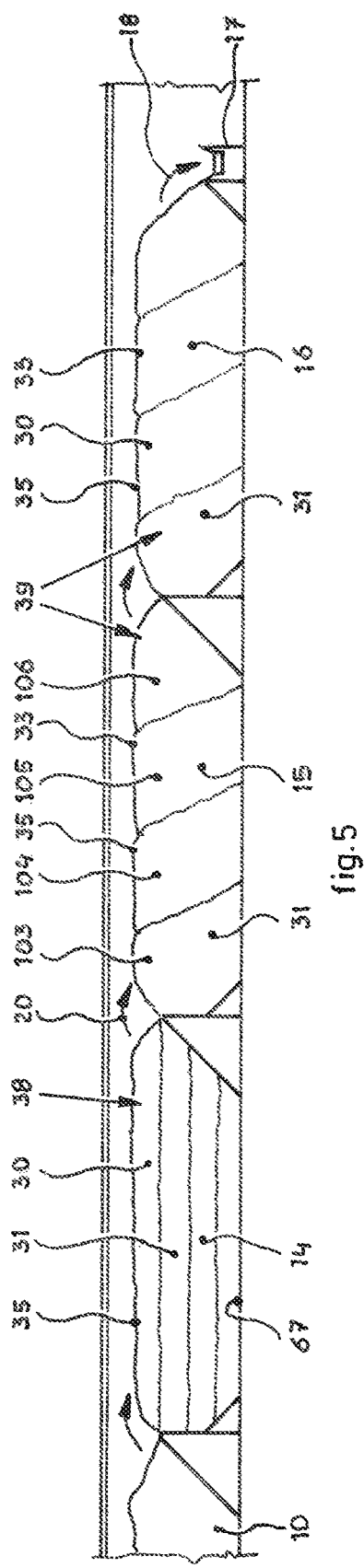
fig. 4
fig. 5

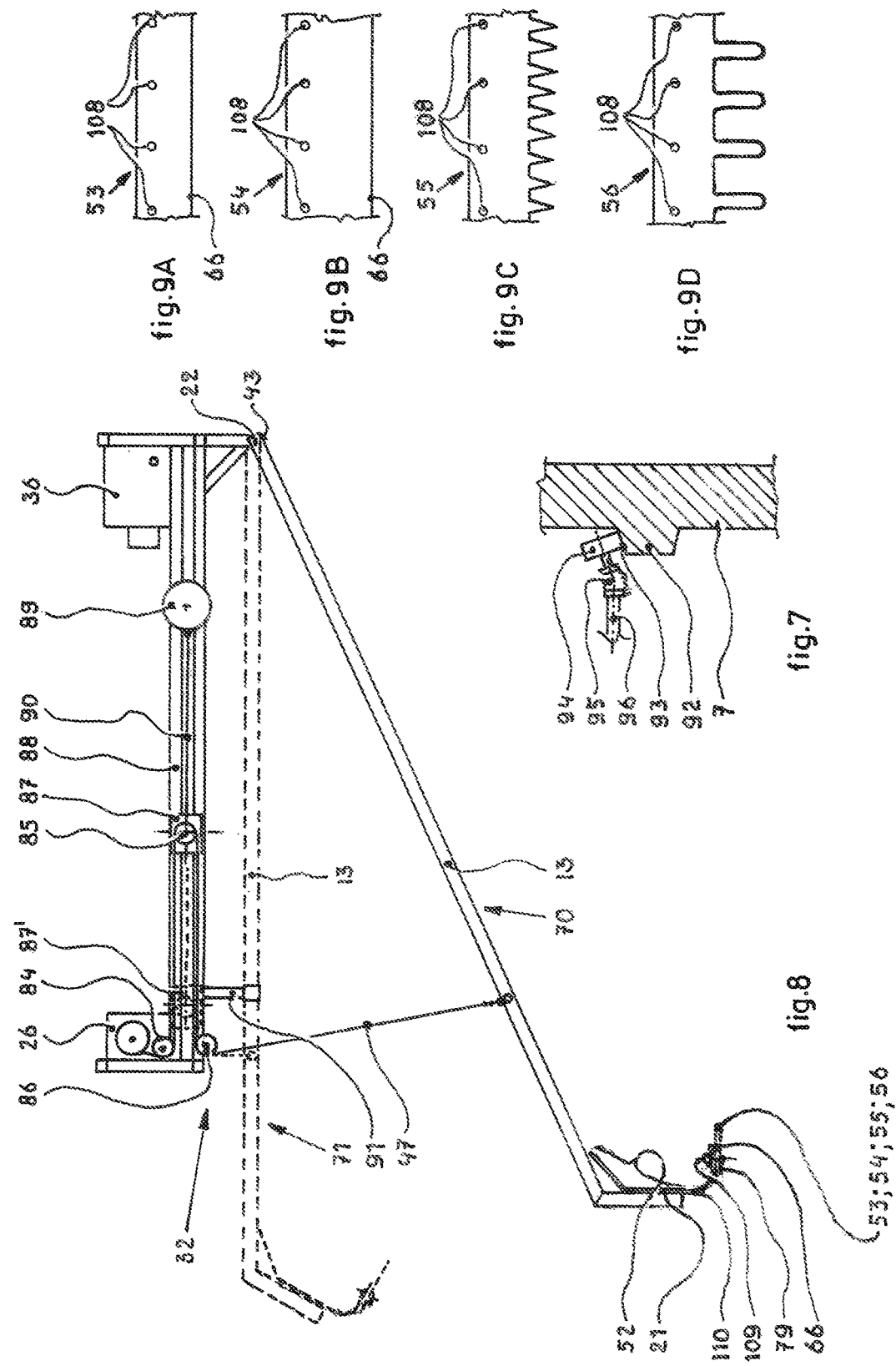

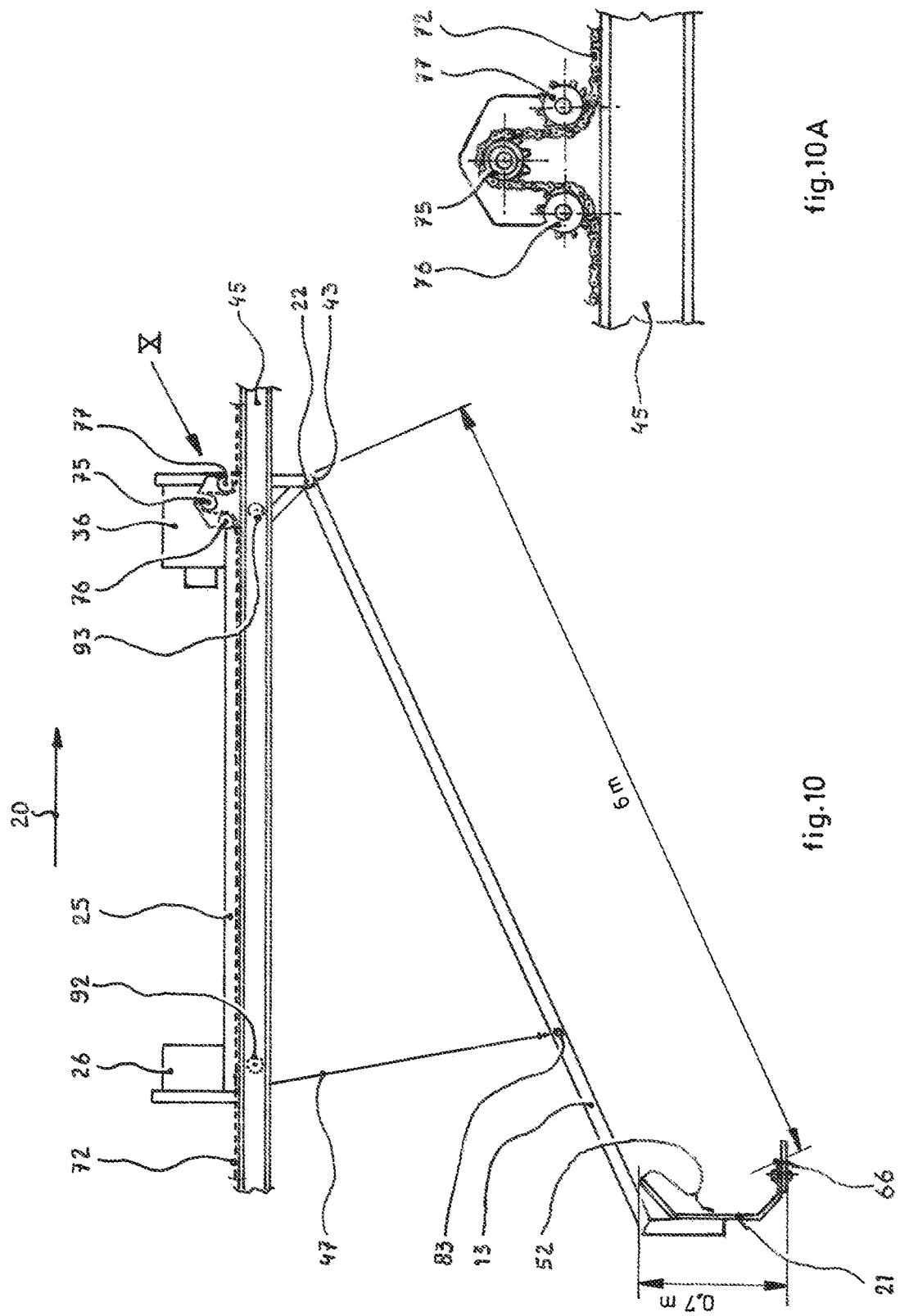

APPARATUS FOR WORKING AND HOMOGENIZING OF A MASS OF LOOSE OR INCOHERENT MATERIAL AND THE METHOD OF OPERATING OF THAT APPARATUS

CROSS-REFERENCE TO RELATED APPLICATIONS

This application is the United States national phase of International Application No. PCT/NL2020/050194 filed Mar. 23, 2020, and claims priority to The Netherlands Patent Application No. 2022866 filed Apr. 4, 2019, the disclosures of which are hereby incorporated by reference in their entirety.

BACKGROUND OF THE INVENTION

Field of the Invention

The invention relates to an apparatus for processing, for example resting for a certain time or otherwise conditioning, and mixing and thus homogenizing a mass (2) of a loose or incoherent material, for example the composting of biological material such as biodegradable waste (vegetable-fruit and garden waste), OWF (Organic Wet Fraction of household waste) or shredded green waste. For many processes it is important that conditioning, mixing and thus homogenizing is executed with a great degree of control.

Description of Related Art

The use of a silo wherein a transport vehicle, in particular a shovel, can drive in and out is well known. The shovel loads the silo from a stockpile by depositing the material to be processed therein. For the mixing and thus sort of homogenizing of the material the shovel consecutively takes a portion out of the pile and deposits it back. As a result, a certain amount of mixing and homogenization of the material of the stack is executed.

Furthermore, automatic working apparatuses exist for the processing of a mass of loose and incoherent material. As examples are mentioned:

so-called turners, systems that go over a pile of material and toss it around. Such systems are used both in outdoor composting, processing in open air without covering, and in so-called tunnel composting, especially in a hall, systems that use a big paddle wheel, for example with a diameter of 5 m, as also used in brown coal mining. Such paddle wheels shovel the material to be composted anyway a certain distance forward, and systems that operate in batches in a closed room.

With these and similar systems, filling and emptying is executed with, for example a shovel, but also an automatically operating system is qualifying. Such an automatic system has, for example a paddle wheel that deposits the material onto a discharge belt. The material is transported to the next enclosed space via a system of conveyors.

These known methods have several disadvantages. For starters, they are labour intensive and they require a lot of energy and maintenance. The driver of the shovel is busy for a long time in mixing and homogenising operations. The heavy-duty shovel motor further consumes a substantial amount of fuel, and the use of the shovel is associated with substantial emissions of $CO_2$, $NO_x$, soot and dust, which is environmentally undesirable. Furthermore, it cannot be prevented that by the lifting and reloading of the loose material with certain material types substantial dust formation occurs. A further disadvantage is that the homogenising is not very accurate and effective and is partly dependent on the skills of the driver.

More automated systems use a shovel or tossing around system that digs through the material, resulting in substantial wear and a high energy consumption. Furthermore, normally an extensive network of conveyor systems is required to move the material from one trench silo to the next trench silo.

On the basis of disadvantages mentioned above of the prior-art methods it is desired to provide an apparatus which is not or at least substantially less, provided with such disadvantages.

In view of the above, the invention provides thereto an apparatus for processing, for example resting for a certain time or otherwise conditioning, and mixing and thus homogenizing a mass of a loose or incoherent material, for example the composting of biological material such as biodegradable waste (vegetable-fruit and garden waste), OWF (Organic Wet Fraction of household waste) or shredded green waste, which apparatus comprises a) at least one trench silo having an inlet, for example an inlet opening that is freely accessible from the outside for feeding raw, unprocessed material, two mutually parallel side walls, an end wall extending transversely to the sidewalls, and a number of partitions with specified, for example equal, spacings between the side walls distributed over the length of the trench silo between the inlet opening and the end wall), dividing the space bounded by the inlet opening, the side walls and the end wall in a number of compartments, in particular an inlet compartment or first compartment, a number of intermediate compartments, for example a second compartment and a third compartment, and an end compartment or fourth compartment, at least in which intermediate compartments and in which end compartment the material is processed, mixed and homogenized.

b) discharge means abutting to the end wall, for example a conveyor belt, for the discharge of processed and mixed material;

c) displacement means for displacing material in steps in the displacement direction from the first compartment through all the intermediate compartments and through the partitions to the end compartment, and finally the depositing of processed and mixed material from the end compartment over the end wall consecutively on the discharge means, wherein the mixing and homogenization occurs as a result of the displacement of the material;

d) a scraper extending transversely to, and with some spacing fitting between, the side walls of the trench silo, up and down pivotably supported by one of the displacement means part of the carriage around a pivot axis effected by at least two hinges by at least two spaced apart support arms, which carriage carries the hinges and is provided with a lifting motor which, together with the hinges forms pivoting means for pivotally supporting the support arms which carriage is movable along fixed horizontal guide rails by drive means, comprising a displacement motor, such that the scraper, every time consecutively may scrape the current top layer with a thickness associated with the vertical dimension of the scraper of a stack of material present in a compartment in the displacement direction and may displace it to the next compartment or the discharge means; which pivot axis is located in the displacement direction downstream of the scraper, such that the scraping each time is executed by pulling from the current top layer;

which scraper may pivot partly under the influence of gravity and partly under the influence of active pivoting means, wherein the pivoting before the scraping in the displacement direction may take place at least partly under the influence of gravity, such that the scraper automatically sort of follows the shape of the free surface of the stack of material; and e) control means defining the operation of the apparatus controlling the displacement means and the pivoting means for the performance of the following steps to be performed in suitable sequence:

e1) moving and depositing in a specified pattern the raw or therein worked material deposited in the first or inlet compartment by repeatedly scraping off a top layer thereof via the first partition to the next or second compartment;

e2) processing of said material in said second compartment by resting it therein for a specified time and optionally treating it with a liquid and/or gas;

e3) scraping off this material deposited in the second compartment in the same way layer by layer and displacing it via the second partition to the next or third compartment, such that the second compartment is emptied;

e4) re-depositing of unprocessed material in the second compartment from the first compartment, and so on;

e5) during continued operation of the apparatus consecutively refilling of a thus emptied compartment with a material from the previous compartment;

e6) consecutively depositing of a mass of material in the end compartment and the displacement of said mass of material over the end wall after a period of processing, for example a rest period, to the discharge means;

e7) each time consecutively returning of the scraper, in particular after the emptying of a compartment, in the opposite direction with respect to the displacement direction to a specified position, in particular in the inlet zone of a previous compartment, which returning is executed by displacement means in a raised position of the scraper, under influence of the action of the active pivoting means, such that the scraper may be returned unimpeded to the specified position.

The control means may comprise a processor with software.

The scraper consecutively scrapes off the current top layer of a stack of material in a compartment and displaces it slidingly and pushing it to the next compartment, respectively the discharge means. This is an operation that consumes relatively little energy, while the production of dust remains very limited.

The control according to the invention may be defined as a sequence of cycles. One cycle comprises two periods. The first period is the process time, wherein the material remains in the compartments; the second period is the transition time wherein the material is displaced from the one compartment to the next compartment by using the scraper, respectively is displaced from the end compartment to be discharged from the discharge means.

For example, allowing a material to rest in a compartment for a specified time is important for composting biological material, such as OWF. For other materials, the rest period may be important, for example, in connection with aeration for drying the material.

The partitions may comprise of zones holding little or no material. In case of complete absence of material in a partition, the partition between successive compartments is well, which improves the controllability of the processing processes. In the case of some overlap between the successive stacks in neighbouring compartments, at least some contamination occurs, as a result of which the processes may be less well controlled.

For the best possible separation between neighbouring compartments, preferably in the apparatus according to the invention the partitions are formed by partition walls. Thus a good separation is guaranteed. Possibly, due to air flows between the compartments that move over the partition walls, still limited contamination and therefore mutual influence could occur. In order to exclude such contamination as much as possible, a curtain or divider could be lowered above the concerning or each partition wall during the resting periods wherein the mass of material in the compartments are resting. In this embodiment it is important that the lower edge of a curtain at least substantially abuts to the top edge of the concerning partition wall or end wall.

The partitions, for example the partition walls, function to realise the best possible separation between the compartments. This is in particular important in relation to the conditioning to be realised, such as for example the separation of the air flows that may differ in each compartment as for their flow rate, temperature, moisture content, and the like, and in order prevent cross-contamination of material in the different compartments.

The European patent EP-B-0 882 390 discloses a dosing unit for potting soil wherein a scraper is used that may move in the longitudinal direction, transverse to the scraper by a displacement vehicle. This document is not relating to a processing apparatus. The dosing unit according to said European patent just relates to the depositing of bulk goods in a silo and the further dosed displacement to a receptacle for further treatment and transport. The functioning of this apparatus therefore differs substantially from the functioning of the device according to the invention. More specific, it focuses on specific methodical steps defined by the control means, that, based on appropriate software that may be adapted by the installer or the user, may ensure that the methodical steps are performed, such that the apparatus is qualified for the processing and mixing and thus homogenizing of a mass of loose or incoherent material.

SUMMARY OF THE INVENTION

The material to be treated with the apparatus according to the invention is in general bulk material, for example biomass, wood chips, brown coal, potting soil, grain, fertilizers, fibre material, sawdust, tree bark, cocoa beans, coffee beans, sludge, paper production residues, recycled plastics, RDF (Refuse Derived Fuel)/SRF (Solid Recovered Fuel), manure, rubber granulate, by-products for fermentation, or biological raw materials for composting. For composting biodegradable waste (vegetable-fruit and garden waste), OWF (Organic Wet Fraction of household waste) or shredded green waste may be considered.

Composting requires a total turnaround time of the order of several weeks.

For filling of the first compartment for example a shovel may be used but the filling may also take place directly from a truck. In such a situation the truck is driven backwards into the first compartment. As an alternative the first compartment may be filled from a pre-processing line using a transport system, for example based on one or more belt or chain conveyors, optionally in combination with or as an alternatively one or more cyclones or the like. In that case, for example, the material may be poured into the first compartment from above, wherein the front of the compartment is preferably closed by an outer wall, a door or a partition. Such automatic filling may take place from a pre-processing line. Therein, the material supplied from the outside may be reduced by using a shredder. Furthermore, ferrous parts may for instance be removed by magnetic means. Furthermore, a pre-sieving operation may be used, in which large parts are removed, for instance parts larger than 400 mm. The material may also be separated by an air flow separator into heavy parts to be removed, such as stones, and the cleaned material fraction, that for further processing is supplied to the device.

The material may be processed in each compartment, including the first or the inlet compartment. It may also be a choice to use that first compartment exclusively for the supply of material, for example during the week, and only later to forward it to the second compartment. This is not possible for vegetable, fruit and garden waste and OWF because conditioning already starts in the first compartment and requires inoculation with an amount of excessively large material of the processed material.

According to an aspect of the invention the apparatus according to the invention is embodied so that the inlet compartment is freely accessible for transportation vehicles, that may deposit material to be processed therein. In the first or inlet compartment the material may be subjected to a first processing, for example a conditioning. In that situation the material deposited therein is allowed to be processed for a certain period of time.

In case the conditioning is executed with air, the first compartment is preferably filled as quick and as complete as possible. This prevents the risk of provoking preferential flows of air, in particular in zones wherein there is no material. The air will preferably pass through these zones, as it encounters there the least resistance. This first compartment is therefore not always freely accessible, but will in this situation be closed after filling.

In order to obtain the most complete possible separation between the operations in the various compartments, use could be made of curtains which may be lowered at the beginning of a rest period or conditioning period above the corresponding partition walls and the end wall, thus after the mass of a previous compartment has been transferred to the concerning compartment.

It should be understood that the compartments do not require to have identical volumes. It may be noted that during conditioning, for example composting and drying, the volume of the material contained in a compartment may significantly decrease, up to 30-40%. Simultaneously the height of the stack of material in a compartment decreases, in other words the dimensions in the displacement direction may be made smaller by limiting the distance between the respective partition walls, respectively the last partition wall and the end wall, wherein the height of the stack remains more or less the same. Oversized material may be present in the processed end material, which is defined as a size above the specified screen size. For composting this is, for example above the 10 mm, for consumer compost, or more than 18 mm for horticultural compost. Often the intermediate size, for example 10-40 mm and the oversized material, for example 40-80 mm, are returned to the start of the process, for example the first compartment and mixed with newly unprocessed material to initiate the composting process. This is possible because the concerning recycled material is richly provided with the good bacteria and acts as a structuring material, that increases the air permeability of the stack. The scraper displaces the top layer of a compartment to a next compartment or to the discharge means. It is also conceivable that the scraper is mounted to a tilting mechanism and that the scraper also functions as a paddle. Such paddle is filled with material that is displaced to the next compartment by the pulling movement in the displacement direction of the scraper.

In an embodiment of the apparatus, the apparatus is positioned under a roof, for example in a hall or a shed, which hall is optionally substantially gastight, to prevent undesired environmental influences, such as extreme temperatures and precipitation and also to prevent dust emissions by the apparatus. This latter feature ensures that the process conditions are controlled, including the temperature, the humidity and the concentrations of gases generated during the operations, the balance between the supply of gas, in particular air, and the discharge of gases.

According to a specific aspect of the invention, to reduce dust formation during the scraping and to ensure a substantially complete emptying, the apparatus may have the feature that on the front side of each partition wall and of the end wall a slope is provided.

According to another aspect of the invention, to ensure a substantially complete emptying the apparatus may have the feature that on the rear side of each partition wall a slope is provided.

According to another aspect of the invention, the apparatus may be provided with the feature that the bottom of each compartment has perforations for the passage of liquids and gases, for example for the discharge of water and for blowing in possibly humidified air or for the extraction of gases.

According to an important aspect of the invention, the apparatus may be provided with the feature that the scraper comprises a generally concave cross-section with a straight lower part and a generally concave upper part adjoining thereto under an angle of the order of 90°-140°. In the situation wherein the straight lower part is in the area of the bottom of the silo it extends approximately parallel to the floor.

According to another aspect of the invention, the apparatus may be provided with the feature that the leading edge of the lower part has a shape that is adapted to the materials to be processed, for example the shape has a certain length in the scraping direction, and/or is straight or is provided with sharp teeth or blunt teeth.

In the situation wherein the scraper is in its lowest position and the straight part is in the area of the bottom of the corresponding compartment, the straight lower part of the scraper extends approximately parallel to the floor. The scraper may displace a larger volume of material in one passage as a paddle by giving this straight lowest part an increased length in the displacement direction.

A practical aspect of the invention may be provided by that freely rotatable rollers are provided on the side edges of the scraper to prevent grinding and abrasive contact of those side edges with the side walls during the scraping. Wear-resistant plastic strips may also be used in combination with profiled walls.

To prevent frictional contact between the leading edge of the scraper and the surface of the slope analogous to the aspect discussed above, the apparatus may comprise the feature that on the side edges of each slope sliding strips are provided for a sliding contact between the leading edge of the scraper and the sliding strips. Such sliding strips may also be provided at the top edge of each wall.

Another aspect of the invention may be that pushing means are added to the first compartment for the displacement in the displacement direction of the material disposed in that compartment.

The advantage of a vertically extending pushing plate or other pushing means may be, that the scraper not requires to be moved over the entire length in the displacement direction during the layer by layer emptying of the first or the inlet compartment, but only over a limited distance.

To prevent that the scraper is subjected to undesired frictional contact with the bottom of the compartments the apparatus may comprise spacing means for holding the scraper at a specified distance from the bottom of the compartments, for example a few millimetres.

Use could be made of a number of free-running rollers or sliding strips attached to the scraper. However, an apparatus wherein the spacing means are part of the active pivoting means is preferred. In that case use could be made of such an active pivoting means control, that based on an approaching signal emanate from for example a mechanical, an optical or a ultrasonic sensor, the active pivoting means are activated to maintain at least the specified minimum distance when a certain minimum distance is reached. In particular, the upper and lower positions of the pivoting arms, and with these those of the scraper, are determined by a switch or said sensor based on the angular position of the arms.

In a practical embodiment the particular control unit of the apparatus is configured for controlling the displacement means and the active pivoting means, such that the scraper in its raised position beyond the discharge means may temporarily be placed in an, out-of-operation, parking position to be subjected to a cleaning operation, for example spraying with high-pressure water and/or treatment with a disinfectant.

To prevent damage to the bottom of the compartments and the scraper, on the bottom of the compartment of the apparatus a top coating, for example of plastic such as PE, HDPE, PVC or the like, may be provided, to prevent corrosion and/or wear of the bottom.

In an important embodiment of the apparatus according to the invention the carriage carries a lifting motor, which, when actuated, may wind at least one flexible pulling member, for example a steel cable or a tensile lifting strap. The pulling member or each of the pulling members is coupled to the support arms, such that the pulling member by actuating the lifting motor pivots the support arms upwards and lifts the scraper to the raised position, and that after the removal, or at least reducing, of the actuation of the lifting motor, such that the scraper under influence of gravity, reduced by any remaining lifting force with reduced actuation of the lifting motor, descends from its raised position and may scrape the actual top layer from a stack of material and during the displacement of the scraper in the displacement direction automatically follows the surface of that stack. An additional weight may potentially be added to the pivoting arms to obtain a desired effective downward weight force of the scraper.

In a specific embodiment of the apparatus according to the invention the control means are configured for stacking layer by layer material scraped from the previous compartment in a compartment, creating a layered loading pattern.

In an further embodiment the apparatus is characterised in that the control means are configured for depositing first material scraped from the previous compartment in the inlet zone of a compartment, subsequently depositing material scraped from the previous compartment to the formed partial stack and so on, until the previous compartment is completely emptied, so creating a spatial sequential loading pattern.

According to further aspect of the invention the displacement means of the apparatus may comprise:
- the carriage;
- the guide rails supporting the carriage in the longitudinal direction that corresponds with the displacement direction; and
- the displacement motor, that, when energized, moves the carriage in the longitudinal direction.

To prevent undesired contact between the top edge of the concerning partition wall and the support arms the apparatus may preferably comprises a slope having a convex shaped longitudinal cross-section, or at least having two straight sections together defining a discrete general convex shape.

The invention furthermore relates to the operation of an apparatus for the processing operation of an apparatus (1) for the processing, for example resting for a certain time or otherwise conditioning, and mixing and thus homogenizing a mass (2) of a loose or incoherent material (3), for example the composting of biological material such as biodegradable waste (vegetable-fruit and garden waste), OWF (Organic Wet Fraction of household waste) or shredded green waste, which apparatus comprises a) at least one trench silo (4) having an inlet, for example an inlet opening (5) that is freely accessible from the outside for feeding raw, unprocessed material, two mutually parallel side walls (6;7), an end wall (8) extending transversely to the sidewalls, and a number of partitions (9a;9b;9c) with specified, for example equal, spacings between the side walls (6;7) distributed over the length of the trench silo between the inlet opening and the end wall), dividing the space bounded by the inlet opening (5), the side walls (6;7) and the end wall (8) in a number of compartments, in particular an inlet compartment or first compartment (10), a number of intermediate compartments, for example a second compartment (14) and a third compartment (15), and an end compartment or fourth compartment (16), at least in which intermediate compartments (14;15) and in which end compartment (16) the material (3) is processed, mixed and homogenized.

b) discharge means abutting to the end wall (8), for example a conveyor belt (17), for the discharge of processed and mixed material (18);

c) displacement means (44;45;72;36;76;77;25;11;12;13; 21) for displacing material (3) in steps in the displacement direction (20) from the first compartment (10) through all the intermediate compartments (14;15) and through the partitions (9a;9b;9c) to the end compartment (16), and finally the depositing of processed and mixed material (18) from the end compartment (16) over the end wall (8) consecutively on the discharge means (17), wherein the mixing and homogenization occurs as a result of the displacement of the material;

d) a scraper (21) extending transversely to the side walls (6;7) of the trench silo (4) and fitting between them with some spacing, up and down pivotably supported by one of the displacement means (44;45;72;36;76;77;

25;11;12;13;21) part of the carriage (25) around a pivot axis (22) effected by at least two hinges (43) by at least two spaced apart support arms (11;12;13), which carriage carries the hinges (43) and is provided with a lifting motor (26) which, together with the hinges (43) forms pivoting means for pivotally supporting the support arms (11;12;13)

which carriage (25) is movable along fixed horizontal guide rails (44;45) by drive means (28), comprising a displacement motor (36), such that the scraper (21), every time consecutively may scrape the current top layer (30) with a thickness associated with the vertical dimension of the scraper of a stack (31) of material (3) present in a compartment (10;14;15;16) in the displacement direction (20) and may displace it to the next compartment (14;15;16) or the discharge means (17);

which pivot axis (22) is located in the displacement direction (20) downstream of the scraper (21), such that the scraping is executed by pulling from the current top layer each time;

which scraper (21) may pivot partly under the influence of gravity and partly under the influence of active pivoting means (26;43;46;47;11;12;13), wherein the pivoting before the scraping in the displacement direction (2) may take place at least partly under the influence of gravity, such that the scraper (21) automatically sort of follows the shape of the free surface (35) of the stack (31) of material (3); and e) control means defining the operation of the apparatus controlling the displacement means (44;45;72;36;76; 77;25;11;12;13;21) and the pivoting means (26;43;46; 47;11;12;13) for the performance of the following steps to be performed in suitable sequence:

e1) moving and depositing in a specified pattern (38; 39) the raw or therein worked material (3) deposited in the first or inlet compartment (10) by repeatedly scraping off a top layer (33) thereof via the first partition (9a) to the next or second compartment (14);

e2) processing of said material (3) in said second compartment (14) by resting it therein for a specified time and optionally treating it with a liquid and/or gas;

e3) scraping off this material (3) deposited in the second compartment (14) in the same way layer by layer and displacing it via the second partition (9b) to the next or third compartment (15), such that the second compartment (14) is emptied;

e4) re-depositing of unprocessed material (3) in the second compartment (14) from the first compartment (10), and so on;

e5) during continued operation of the apparatus (1) consecutively refilling of a thus emptied compartment (14;15;16) with a material (3) from the previous compartment (13;14;15);

e6) consecutively depositing of a mass (2) of material (3) in the end compartment (16) and the displacement of said mass (2) of material (3) over the end wall (8) after a period of processing, for example a rest period, to the discharge means (17);

e7) each time consecutively returning of the scraper (21), in particular after the emptying of a compartment (14;15;16), in the opposite direction with respect to the displacement direction to a specified position, in particular in the inlet zone (78) of a previous compartment (10;14;15), which returning is executed by displacement means (44;45;72;36;76; 77;25;11;12;13;21) in a raised position (71) of the scraper (21), under influence of the action of the active pivoting means (26;43;46;47;11;12;13), such that the scraper (21) may be returned unimpeded to the specified position.

In a specific embodiment of the operation according to the specification disclosed above the control means control the displacement means and the active pivoting means such that the scraper in his out-of-operation raised position is temporarily placed in a parking position beyond the discharge means to be subjected to a cleaning operation, for example spraying with high-pressure water and/or treatment with a disinfectant.

According to a further aspect of the operation of the apparatus according to the invention the control means control the displacement means and the active pivoting means so that the scraper stacks material scraped from the previous compartment layer by layer in a compartment, creating a layered loading pattern.

According to a final aspect of the operation of the apparatus according to the invention the control means control the displacement means and the active pivoting means so that the scraper first deposits material scraped from the previous compartment in the inlet zone of a compartment, subsequently deposits material scraped from the previous compartment to the thus formed partial stack, and so on, until the previous compartment is completely emptied, creating a spatial sequential loading pattern.

BRIEF DESCRIPTION OF THE DRAWINGS

The invention will now be elucidated with reference to the following drawings. The drawings show in:

FIG. 4 a longitudinal cross-section through a trench silo, in which embodiment the applied layered stacking structure is schematically represented;

FIG. 5 a longitudinal cross-section corresponding with FIG. 4, wherein in a second compartment a layered stacking structure and in the third and the fourth compartment a spatial sequential stacking is schematically represented;

FIG. 7 a cross-section of an alternative for the steel rails according to FIG. 6;

FIG. 8 the longitudinal cross-section VII-VIII from FIG. 6, wherein the effective scraper position of the scraper is shown in solid lines and the raised rest position in dashed lines;

FIGS. 9A, 9B, 9C, 9D schematically parts of four different types of scraper edges;

FIG. 10 a side view of the driving part of the apparatus according to FIG. 6;

FIG. 10A the detail X of FIG. 10 on a larger scale;

DESCRIPTION OF THE INVENTION

The FIGS. 1,2,3 and 6 show an apparatus 1 for processing during at least a certain time, for example conditioning, and mixing and thus homogenizing of a mass 2 of loose or incoherent material 3, for example composting of biodegradable waste such as vegetable, fruit and garden waste, OMF and/or shredded green waste.

Figure 6:
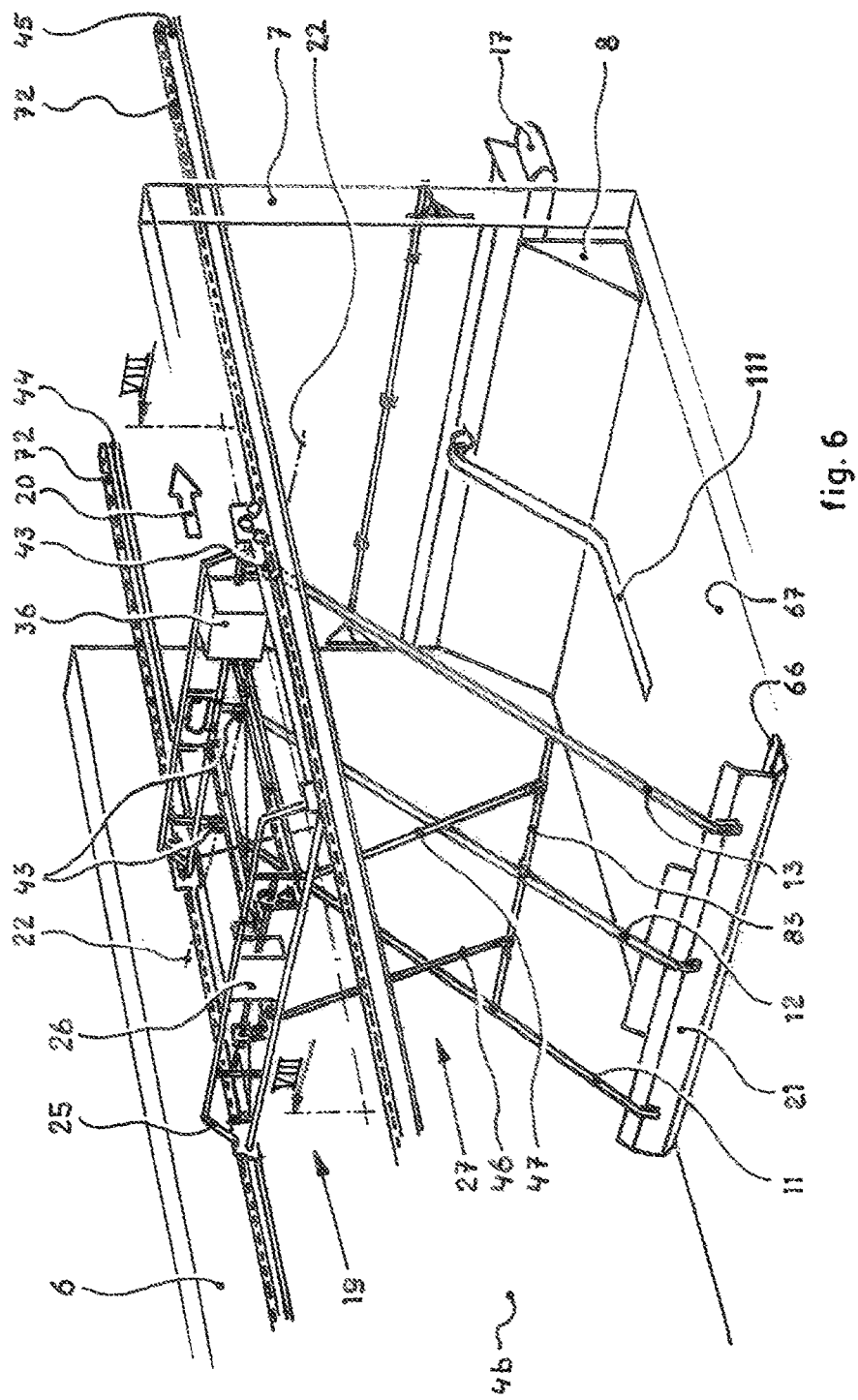
FIG. 6 a perspective partial view of the displacement means and the scraping means.

The apparatus 1 comprises in this embodiment:
- a) five individual operating, all by a central control unit controlled, side by side adjoining trench silos 4, each with a width of 6 m and each with an inlet opening 5 that is freely accessible from the outside, extending in a vertical plane, for the inlet of raw, unprocessed material, two mutually parallel side walls 6;7, an end wall 8 extending transversely to the side walls, and three partition walls 9a;9b;9c equally spaced along the length of the trench silo 4 between the inlet opening 5 and the end wall 8 extending transverse to the side walls 6;7, that divide the space bounded by the inlet opening 5, the side walls 6;7 and the end wall 8 into a number of compartments, more specific an inlet compartment or first compartment 10, a number of intermediate compartments, more specific a second compartment 14 and a third compartment 15, and an end compartment or fourth compartment 16, in which intermediate compartments 14;15 and in which end compartment 16 the material 3 is processed, mixed and thus homogenized;
- b) a conveyor belt 17 abutting to the end wall 8 for the discharge of processed and mixed material 18;
- c) displacement means 44;45;72;36;76;77;25;11;12;13;21 for in steps displacing material 3 in the displacement direction 20 from the first compartment 10 via the intermediate compartments 14;15 over the intermediate walls 9a;9b;9c to the end compartment 16, and finally moving material from the end compartment 16 over the end wall 8 each time consecutively depositing processed and mixed material 18 onto the discharge means 17;
- d) a scraper 21 extending transverse to, and with some spacing fitting between, the side walls 6;7 of the trench silo 4, that is carried by one of the displacement means 44;45;72;36;76;77;25;11;12;13;21 forming a part of the carriage 25 up and down pivotable carried by a pivot axis 22 formed by three hinges 43 of three mutually spaced support arms 11;12;13, which carries the hinges 43 and is provided with a lifting motor 26 that together with the hinges 43 forms the pivoting means for the pivotable support of the support arms 11;12;13,
    which carriage (25) is movable along fixed horizontal guide rails (44;45) by a displacement motor (36), such that the scraper (21), each time consecutively may scrape the current top layer (30) with a thickness associated with the vertical dimension of the scraper of a stack (31) of material (3) in a compartment (10;14;15;16) in the displacement direction (20) and may displace it to the next compartment (14;15;16) or to the discharge means (17);
    which pivot axis (22) is located in the displacement direction (20) downstream of the scraper (21), such that the scraping each time is executed by pulling from the current top layer;
    which scraper (21) may pivot partly under the influence of gravity and partly under the influence of active pivoting means 26;43;46;47;11;12;13, wherein the pivoting before the scraping in the displacement direction (2) may take place at least partly under the influence of gravity, such that the scraper (21) automatically sort of follows the shape of the free surface (35) of the stack (31) of material (3); and
- e) control means defining the operation of the apparatus controlling the displacement means (44;45;72;36;76; 77;25;11;12;13;21) and the pivoting means (26;43;46; 47;11;12;13) for execution of the following steps to be executed in proper sequence:
    - e1) moving and depositing in a specified pattern (38; 39) the raw or therein worked material 3 deposited in the first or inlet compartment (10) by repeatedly scraping off a top layer (33) thereof via the first partition (9a) to the next or second compartment (14), wherein reference is made to the FIGS. 4 and 5 illustrating two examples of different possible loading patterns;
    - e2) processing of said material (3) in said second compartment (14) by resting it therein for a specified time;
    - e3) in the same way scraping off this material (3) deposited in the second compartment (14) layer by layer and displacing it to the next or third compartment (15), such that the second compartment (14) is emptied;
    - e4) from the first compartment (10) re-depositing unprocessed material (3) in the second compartment (14), and so on;
    - e5) during continued operation of the apparatus (1) consecutively with a material (3) from the previous compartment (13;14;15) refilling of a thus emptied compartment (14;15;16);
    - e6) consecutively depositing of a mass (2) of material (3) in the end compartment (16) and the displacement of said mass (2) of material (3) according to an arrow 111 shown in FIG. 6 over the end wall (8) after a period of processing, for example a rest period, to the discharge means (17);
    - e7) each time consecutively returning of the scraper (21), in particular after the emptying of a compartment (14;15;16), in the opposite direction with respect to the displacement direction to a specified position, in particular in the inlet zone (78) of a previous compartment (10;14;15), which returning is executed by displacement means (44;45;72;36;76; 77;25;11;12;13;21) in a raised position (71) of the scraper (21), under influence of the action of the active pivoting means (26;43;46;47;11;12;13), such that the scraper (21) may be returned unimpeded to the specified position.

As an alternative the open top of the first compartment may serve as a horizontally extending inlet opening instead of the vertically extending inlet opening 5.

The partition between the compartments may be enhanced by temporarily lowering a curtain over the corresponding partition walls and the end wall during resting periods.

Processed and mixed material 18 is dispensed and further transported by the discharge conveyor 17 or, in another embodiment, for example a discharge transport vehicle. A temporary excess of processed and mixed material 18 is returned to the area of the inlet openings 5*a*;5*b*;5*c*;5*d*;5*e* according to an arrow 106 to be deposited in a trench silo 4*a*;4*b*;4*c*;4*d*;4*e* again, for example, through an inlet opening 5*a*;5*b*;5*c*;5*d*;5*e* by a transport vehicle 40.

Figure 1:
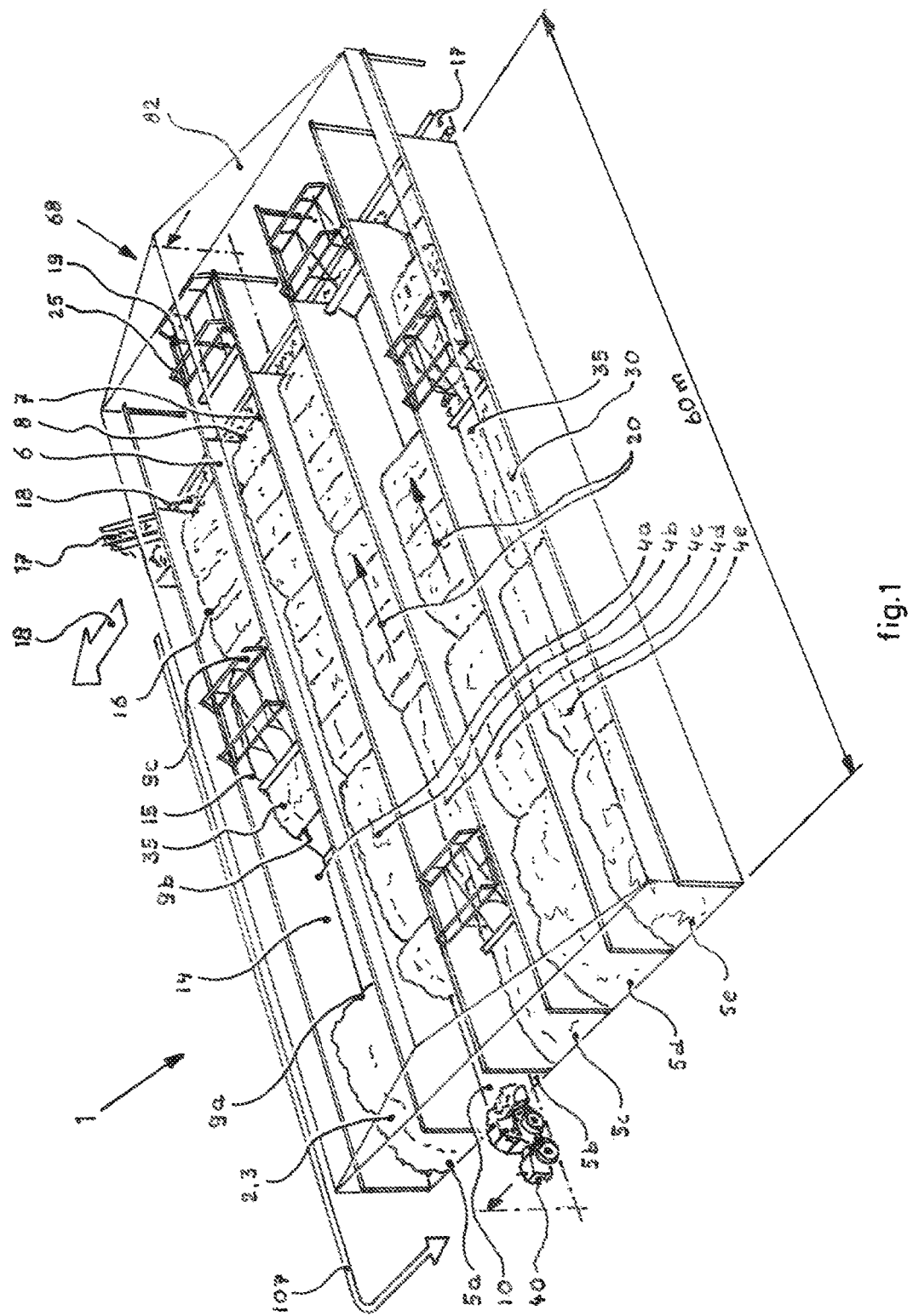
FIG. 1 a perspective view, partly in perspective, of five elongated trench silos comprising in an exemplary embodiment of the invention an apparatus placed under a roof.
Figure 2:
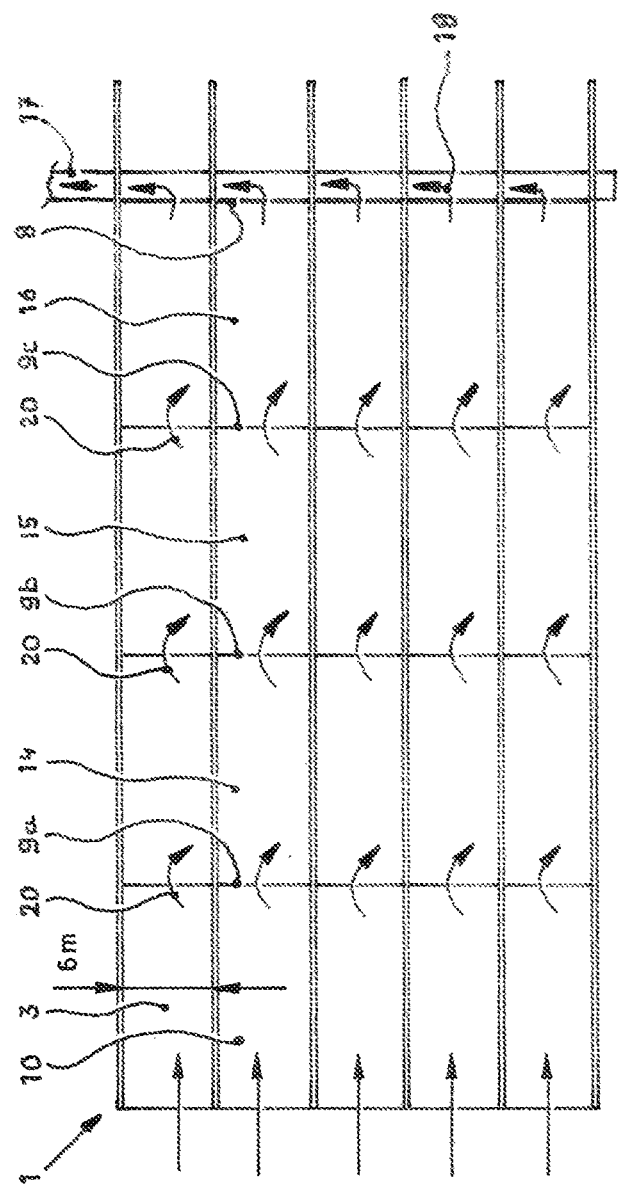
FIG. 2 a schematic top view of the apparatus according to FIG. 1, wherein schematically the material flows are indicated.

As FIG. 1 shows, the first or the inlet compartment 10 of for example the trench silo 4*b* is freely accessible for transport vehicles 40, that may material 3 to be processed deposit therein.

FIG. 1 further shows that the apparatus 1 is placed under a roof 82. The roof 82 may be added to the apparatus 1 itself, but as an alternative the apparatus 1 may be arranged for example in a shed. The roof 82 may be important for limiting the emission of undesired substances and gasses to the environment, but may also be equipped with ventilation means for example for the removal of water vapour that is released by a stack of material during the rest periods, while the operating conditions of the device 1 are limited or not affected by external conditions, in particular the weather.

Figure 3:
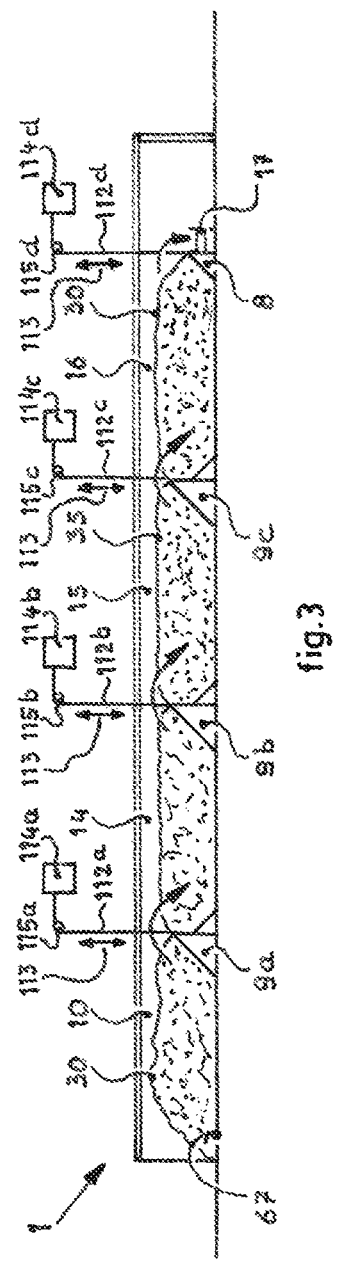
FIG. 3 a schematic longitudinal cross-section through a fully filled trench silo, schematically indicating the material flows.

FIGS. 3,4 and 5 show that in this preferred embodiment a slope 41 is provided at the front of each partition wall 9*a*;9*b*;9*c* and of the end wall 8 to prevent dust formation during scraping and to ensure as much as possible emptying of each compartment 10;14;15;16.

FIGS. 3, 4 and 5 also show that a ramp 42 is provided at the rear of each partition wall 9*a*;9*b*;9*c* to ensure the full emptying of each compartment. It will be clear that ramps 41;42 have the effect of preventing blind sports which could adversely affect the ability to scrape a compartment completely empty by the scraper 21.

Above the partition walls 9*a*;9*b*;9*c* and the end wall 8 corresponding separation curtains 112*a*;112*b*;112*c*;112*d* are located, which are in a raised position at least during movement of the hereafter to be described carriage 25 and therewith the scraper, wherein the carriage 25 may pass a corresponding curtain 112*a*;112*b*;112*c*;112*d*, and that may be brought into the lowered position during standstill of the carriage 25 shown in FIG. 3, wherein they at least substantially abuts the top edges of the partition walls 9*a*;9*b*;9*c* and the end wall 8. In FIG. 3, double arrows 113 indicate that these curtains may move up and down. The curtains are thereto flexible designed, for instance in the form of a flexible plastic sheet or as a blind curtain. By corresponding actuators 114*a*;114*b*;114*c*;114*d* the curtains 112*a*;112*b*;112*c*;112*d* may be move up and down, in the present embodiment they are diverted around corresponding diverting rollers 115*a*;115*b*;115*c*;115*d*.

It may be apparent from FIG. 3, that due to the shown lowered operating position of the curtains 112*a*;112*b*;112*c*;112*d*, little or no contamination may occur between the compartments 10;14;15;16. The curtain 112*d* above the end wall 8 serves for example to limit as much as possible the emission of unpleasant smelling gases to the compartment 16.

FIG. 6 shows the construction of the carriage 25 more in detail, that is displaceable along the guide rails 44;45. FIG. 6 also shows the lowest effective scraping position that is indicated in FIG. 8 with reference number 70. The arrow 111 corresponds to the lowest scraping displacement of the scraper 21.

FIG. 6 shows the shape of the scraper 21. This consist of sheet metal and has a general paddle shape.

FIG. 8 shows the manner in which the scraper 122 is bent from a sheet metal by a number of bending operations into the clearly shown paddle shape, inter alia, in FIG. 8 and FIG. 10. This shape may also be qualified as general prismatic, in that the scraper at each longitudinal position has the same cross-sectional shape.

Figure 13:
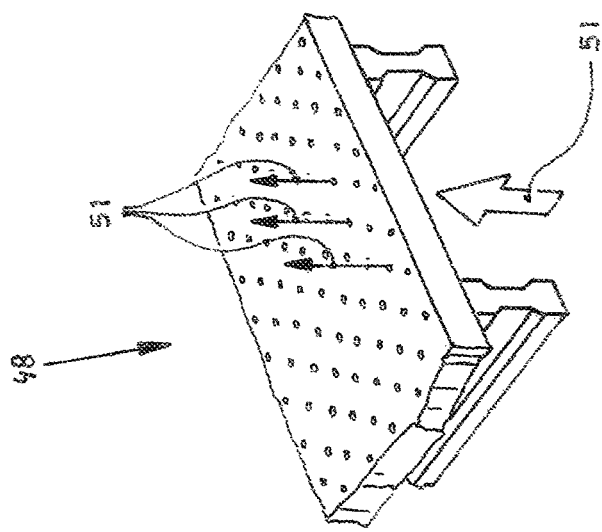
FIG. 13 a perspective view of a part of a perforated bottom of a compartment.

FIG. 13 shows, that the bottom 48 of each compartment 14;15;16 for passage of liquids and gases has a regular pattern of perforations 50, for example for the discharge of water and for the passage of air 51.

In particular the FIGS. 8 and 10 clearly show, that in this embodiment the scraper 21 comprises a generally concave cross-section with a straight lower part 79 and an generally concave upper part 52 adjoining thereto under an angle of the order of 100°-130°. The lowest straight part 79;53;55;56 of the scraper 21 extends approximately horizontal in its lowest position, wherein it is located in the area of the bottom 67.

The FIGS. 9A, 9B, 9C and 9D show that the leading edge of the lowest part 79 of the scraper may have a shape adjusted to the materials to be processed. The FIGS. 9A and 9B show for example respectively a part 53 with a relatively short length and a part 54 with a longer length, while the FIGS. 9C and 9D show variants with teeth, more specific respectively a part 55 with sharp teeth and a part 56 with blunt teeth. The displacement capacity of the scraper 21 is determined by its shape, including the length of the straight part 79.

The plate-shaped straight parts 53;54;55;56 are preferably made of wear-resistant steel and show each a row of through holes 108 for receiving the coupling bolts 109, that couple, as shown in FIG. 8, with the associated nuts, the concerning part 53;54;55;56 with the other straight bottom part 110 of the scraper 21.

Figure 11:
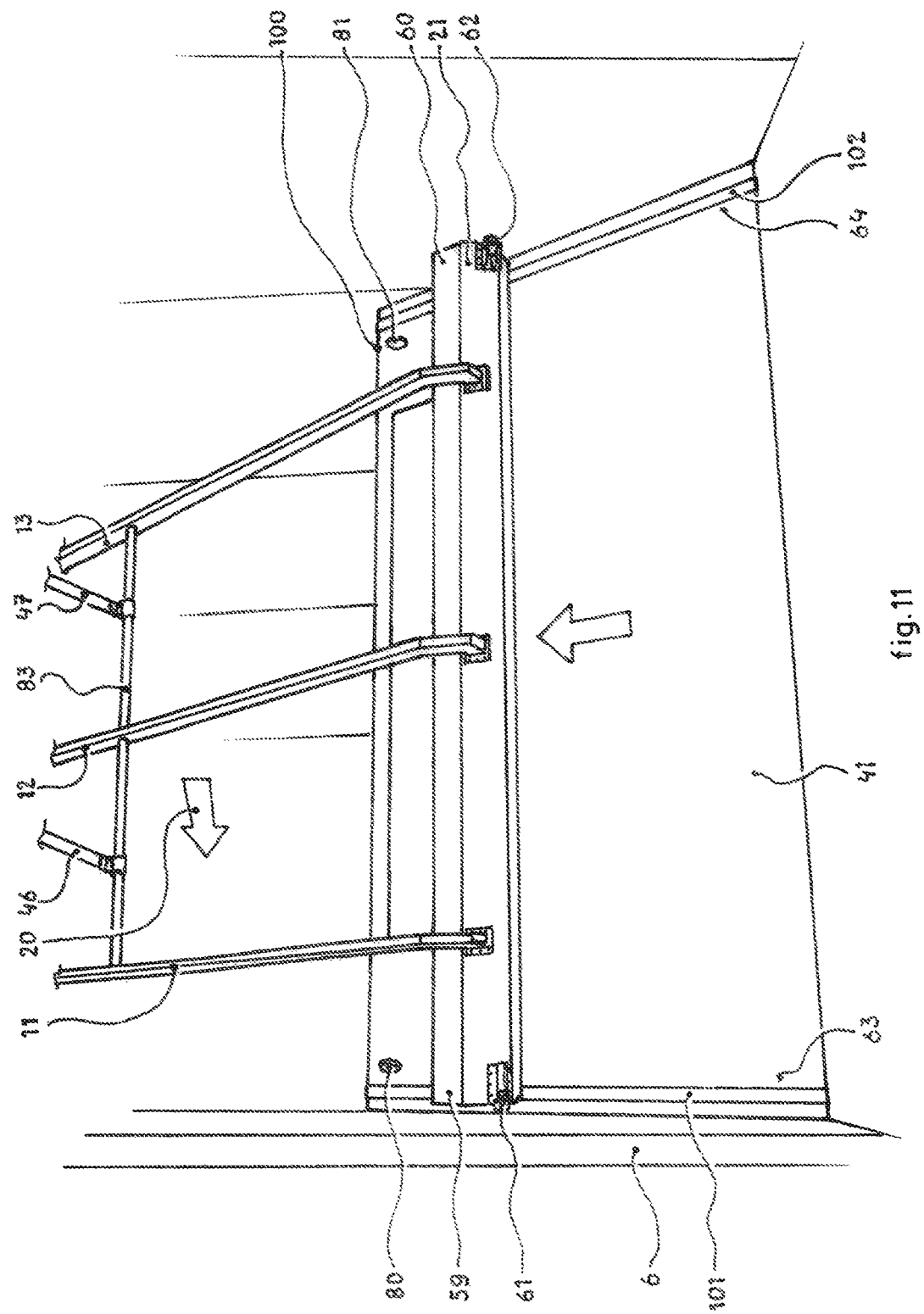
FIG. 11 a perspective view of the scraper in the situation wherein it moves over a slope of a partition wall.

FIG. 11 shows that free rotatable rollers 61;62 are provided on the side edges 59;60 of the scraper 21, to prevent during the scraping grinding and abrasive contact of those side edges 59;60 with the side walls 6;7. It must be understood that the rolling direction of the free rotatable rollers is not in all circumstances corresponding with the displacement direction of the rollers over the side walls 6;7. Strictly speaking, this would mean that the rollers should be freely pivotable. However, the acting forces are limited and only minor displacement corrections are involved. In practice rollers 61;62 suffice that are arranged in a fixed position relative to the scraper 21.

FIG. 11 further shows that to prevent frictional contact between the leading edge 66 of the scraper 21 and the surface of the slope 41 in this embodiment wear-resistant steel sliding strips 101;102 are provided on the side edges 63;64 of each slope 41 for a sliding contact between the leading edge 66 of the scraper 21 and the sliding strips 101;102.

According to a next aspect, that is not shown in the drawings, the apparatus 1 may be designed so that for the displacement in the displacement direction 20 of the in that compartment 20 disposed unprocessed material 3 pushing means are added to the first compartment 10, which pushing means are for example designed as an upright push plate with associated drive.

Also not shown in the drawings is an embodiment wherein the apparatus comprises:
  spacing means for the holding of the scraper 21 at a specified distance, for example a few millimetres, from the bottom 67 of the compartments 10;14;15;16. In a straightforward embodiment said spacing means may comprise a number of free-running rollers or sliding strips attached to the leading edge 66 of the scraper 21 that protrude over the specified distance outside the scraper 21. The embodiment wherein the spacing means are part of the active pivoting means 26;43;46; 47;11;12;13 is however preferred.

The apparatus 1 is suited for processing of the most various types of material. Many materials, for instance material to be composted and biological material composted in the apparatus 1 may give rise to adhering to and soiling of the scraper 21. Related to this, an embodiment is important wherein the control unit is configured for controlling of the displacement means 44;45;72;36;76;77;25;11;12;13;21 and the active pivoting means 26;43;46;47;11;12;13 as indicated in FIG. 8, such that the scraper 21 in its raised out-of-operation position 71 temporarily may be placed in a parking position 68 beyond the discharge means 17 to be subjected to a cleaning operation, for example spraying with high-pressure water and/or treatment with a disinfectant.

In FIG. 8 the active scraping position 70 of the scraper 21 is shown in solid lines. The raised position 71 is indicated with dashed lines. Referring to FIG. 1 attention is drawn to the second trench silo 4b, showing that the carriage 25 is positioned beyond the discharge conveyor belt 17. This is the in FIG. 1 shown parking position 68. In this position 68 the scraper 21 may be cleaned with for example with high pressure water, if desired in combination with disinfectants.

Not shown in the drawings is that, according to an aspect of the invention, to prevent corrosion and/or wear of the bottom 67 a top coating may be provided on the bottom 67 of the compartments 10;14;15;16, for example a plastic coating, such as a coating from PE, HDPE, PVC or the like.

FIG. 8 shows the carriage 25 with the later elucidated lifting means, that are provided to cause the scraper 21 to scrape the top layer 30 of a stack 31 of material 3 with a certain downward force and to have it transported to a next compartment 14,15,16 or the discharge conveyor 17. With solid lines the active scraping position 70 is shown, while the raised resting position 71 of the support arms 11;12;13 and of the scraper 21 is shown with dashed lines.

The carriage 25 carries a lifting motor 26, which, upon actuation, winds up two flexible lifting straps 46;47, that engage a cross bar 83 that rigidly couples the supporting arms 11;12;13. From the lifting motor 26, the lifting belts first run over freely rotatable diverting rollers 85, then around a turning roller 85 to be described below and subsequently back to a diverting roller 86 to then extend downwardly and engage the corresponding supporting arms 11;12;13 at a distance in the order of 50%-60% of the total length of the supporting arm relative to the pivot axis 22. The turning rollers 85 are supported by an auxiliary carriage 87 that is movable back and forth by a longitudinal guide 88 and is held under pretension by a spring drum 89 in FIG. 8 with a to the right pre-tensioned steel cable 90.

In the situation shown in solid lines in FIG. 8, the lifting motor 26 has little or no power and therefore exerts only a limited or no pulling force on steel cable 90. Under the influence of the pulling force in the steel cable 90, the reversing roller 85 has moved more or less freely to the right, while the support arms 11;12;13 are in a relatively low effective scraping position 70, wherein the scraper 21 may scrape the upper layer 30 of a stack 31 of material 3, while the carriage 25 is moved in the displacement direction 20 by the activity upon energization of the displacement motor 36.

After finishing the scraping treatment, the scraper 21 is moved upward to the rest position 71 as shown in FIG. 8. The lifting motor 26 is energized for moving the scraper 21 from the active scraper position 70 to the raised rest position 71. As a result, the lifting belts 47 are wound up, whereby, due to the action of the spring drum 89, against the rightward tensile force in the steel cable 90 a leftward directed force is exerted on the diverting rollers 85. As a result of the weight of the downwardly directed force on the support arms 11;12;13, the gravity ensures that these support arms 11;12; 13 initially remain in their lowered position 70. The auxiliary carriage 87 is moved to the left, until it reaches the stop location indicated by 87 and dashed lines. At that stage, the continued actuation of the lifting motor 26 solely for the lifting of the support arms 11;12;13 may act the upward pulling force in the lifting belts 46;47. These support arms are thus pivoted from the lowered scraping position 70 to the rest position 71. The support arms are on the one hand held in the horizontal position 71 shown in FIG. 8 by the upward directed pulling force in the lifting belts 46,47, and, on the other hand by the highest position determined by a stop support 91. This is the stable raised or raised rest position 71, wherein the carriage 25 may be returned to any desired location, for example it may be placed in the in FIG. 1 shown parking location 68.

From abovementioned description of FIG. 8, it appears that the carriage 25 supports the lifting motor 26, which, when actuated, may wind up the two lifting belts 46;47, which lifting belts 46;47 are coupled to the support arms 23;24, such that the lifting belts 46;47, when the lifting motor 27 is actuated, swing the support arms 11;12;13 upwards and lift the scraper 21 to the raised rest position 71, and that after lifting, or at least reducing the actuation of the lifting motor 26, the scraper 21 under the influence of gravity, reduced by any remaining lifting force with reduced actuation of the lifting motor 26, drops from its raised rest position 71 and may scrape the current top layer 30 of a stack 31 of material 3 and the surface 35 of that stack 31 automatically follows during the displacement of the scraper 21 in the displacement direction 20.

During a scraping treatment, the diverting roller 85 spring loaded by the spring drum 89 acts as a loop catcher for the lifting belts 46;47.

More in particular reference is now made to the FIGS. 10 and 10A. The carriage 25 is displaceable in the displacement direction 20 vice versa by longitudinal guide rails 44;45.

Added to each of the guide rails 44;45 is a chain coupled with its end zones to the guide rails 44;45, that cooperates with a drive gear 75 that may be driven by a displacement motor 36 carried by the carriage 25. As shown in particular in FIG. 10A, at the location of the drive gear 75, the concerning chain 72 has been moved out of its path two positioning gear 76, 77 arranged on either side of the drive gear 75. Due to this construction, the chain 72 remains stationary with respect to the guide rails 44;45 outside the area indicated in FIG. 10A and functions as a flexible rack.

Based on abovementioned description it will be clear how the displacement motor 36 may displace the carriage 25 along the guide rails 44;45.

FIG. 10 schematically shows supporting rollers 92;93 that are connected to the carriage 25 and that may roll over the guide rails 44;45. The figure further shows the approximate length of the support arms 11;12;13, more specific 6 m. The height of the scraper is approximately 0.7 m FIG. 7 shows an alternative to the guide rails 44;45. In the embodiment shown in FIG. 7 the concrete side walls 6;7 are provided with an inwardly projecting guide edge 92, of which the inwardly downwardly sloping top surface 93 supports support and drive rollers 94, which support the carriage 25 and which are connected to the displacement motor 36 (not shown in this figure) via CV joints 95 with bellows seal via a shaft 96. The length of the support arms 11;12;13 is dependent from the height of the guide rails 44;45, which in turn depends on the desired maximum layer thickness to be scraped off. Because the support arms 11;12;13 in the lowest position of the scraper 21 have an angular position of approximately 45°, the length of the arms is thus a factor $\sqrt{2}=1.414\times$the height of the pivot axis 22 relative to the bottom 67. This pivot axis 22 is located some distance below the height of the guide rails 44;45.

FIG. 4 shows that the control means for example may be configured for stacking material 3 scraped layer by layer from the previous compartment 13;14;15 in a compartment 14;15;16, so creating a stratified or layered loading pattern 38. This loading pattern 38 is recognisable in the compartments 14;15 and 16, wherein it is highly schematized represented.

FIG. 5 shows an alternative, wherein the control means are configured for first depositing the material scraped from the previous compartment 10;14;15 in the inlet zone of a compartment 14;15;16 and subsequently depositing the material 3 subsequently scraped from the previous compartment 10;14;15 on the partial stack 103 thus obtained, and so on, until the previous compartment is completely emptied, creating a spatial sequential loading pattern 39. This spatial sequential loading pattern is recognizable in the compartments 15 and 16, while the layered loading pattern is recognizable in the compartment 14. The loading patterns are shown highly schematized.

It is important to note that with each successive scraping of the top layer 33 of the stack 31 of material 3 in the compartment 15, during transport to the next compartment 16 a strong mixing occurs of the material 3 of the four sequentially arranged and adjacent stacks 103;104;105;106. After all, this is loaded from the inlet side, in the drawing the left side, after which subsequent layers are deposited in the adjacent area to the right and so on. It will be clear that so a superior mixing and homogenisation is obtained. A certain mixing and homogenisation also occurs upon each successive time the top layer 33 of the stack 31 of material 3 is scraped from compartment 16, that is consecutively fed to the discharge conveyor 17.

Figure 12:
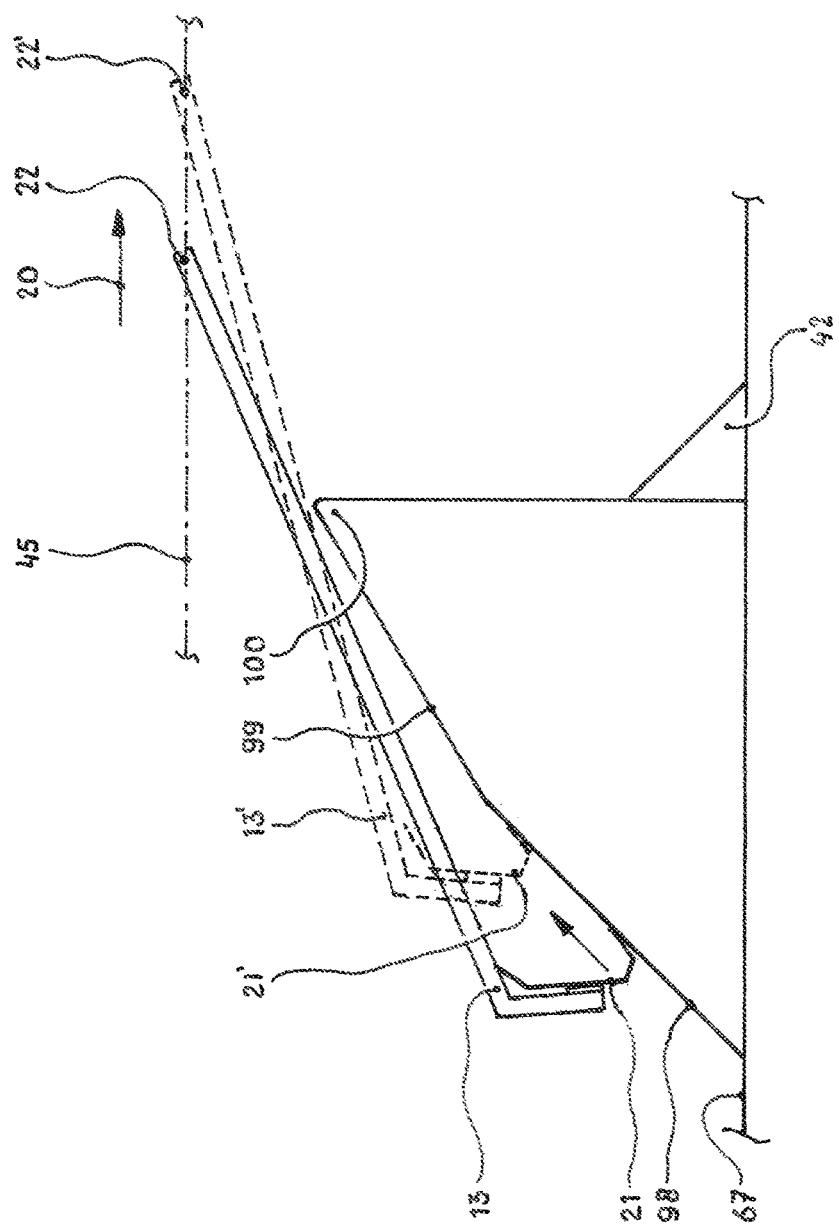
FIG. 12 a schematic longitudinal cross-section of an alternative slope of a partition wall, that has a kinked shape to prevent contact of the pivoting arms with the top edge of the partition wall.

FIG. 12 shows an alternative embodiment of the slopes 41 mentioned and shown above. The ramp 97 of FIG. 12 comprises two contiguous straight sections 98 and 99 respectively, with an angle that deviate approximately 20°-40° from 180°, and thus has a discrete generally convex shape. Upon displacement of the carriage 25 (not shown) to the right with the pivot axis according to the displacement direction 20, the support arms 11;12;13 will never come in contact with the top edge 100 of the concerning partition wall 9a;9b;9c because of the bend in the slope 98;99 shown in FIG. 1, even in the situation wherein, according to the situation shown in FIG. 12, the scraper 21 is in its lowest possible position. For illustration purposes, the support arms 11;12;13 are shown in two positions, more specific a first position, in which the visible support arm is shown with solid lines that is indicated with reference number 13 and a second position, wherein the visible support arm is shown with dashed lines and that is indicated with reference number 13'. These two positions correspond with the positions of the pivot axis along the guide rails 44;45 respectively indicated by 22 and 22'. A straight slope may be used up to a height of about 1.5 m; above this value, use can advantageously be made of a generally convex shape for example a kinked slope 98;99 according to FIG. 12.

As an alternative the slope may show a continuous convex shape.

It is, dependent on the nature and quality of the imported material 3, conceivable that the material contains waste, in particular construction materials, such as pieces of plastic, stones and pieces of metal. This waste may be removed in advance in manner well known from waste processing.

When biological material 3 is composted by the apparatus 1 according to the invention for a period of the order of 20 to 30 days, the microbiological activity in that material 3 may cause such an increase in temperature that during a rest period the material 3 will heat. Because this is undesirable, the core temperature of a stack 31 of present material 3 in a compartment 10;14;15;16 may be advantageously be measured and may when a critical temperature is exceeded be intervened by the control system, such that the concerning stack 31 of material 3 is scraped off, whereby the material 3 is set in motion, comes into contact with the relatively cool ambient air, cools and in the cooled state is deposited in the next compartment 14;15;16, respectively on the discharge conveyor 17.

In case of emergency, for example in the event wherein the electrical controls and the actuation of the apparatus fails and overheating occurs, partition walls 9a;9ab;9c may be removed as shown in FIG. 11 by lifting and removing them using suitable lifting means by the lifting eyes 80;81. To prevent fire the trench silo 4 may be emptied with a shovel after removal of the partition walls 9a;9b;9c and possibly the end wall 8.

In particular in the case wherein the apparatus 1 is used for composting, the partition walls 9a;9b;9c and the end wall 8 may be made from for example hardwood instead of concrete. Another possible material choice is concrete plywood or steel.

As indicated in FIG. 1, in the illustrated exemplary embodiment the total length of the apparatus 1 is approximately 60 m. FIG. 4 approximately shows the other concerning sizes. For example, the length of each compartment 10;14;15;16 is about 15 m, the height of the side walls 6;7 5 m, the height of the stacks 31 4 m, the height of each partition wall 9a;9b;9c including the infeed slope 41 3 m, the height of the discharge slope 42 1.5 m, and the height of the end wall 1.5 m. Other embodiments may have different dimensions.

FIG. 13 shows a floor 48 provided with a regular pattern of perforations 50. This allows downwards discharge of excess moisture from a resting mass 2 of material 3 and possibly upwards blown through the mass 2 humidified air 51, while the compartments 10;14;15;16 may be emptied almost completely. Bacterial cultures may be added to the blown air to initiate and maintain a biological conditioning process of the material to be processed by the apparatus.

Figure 14:
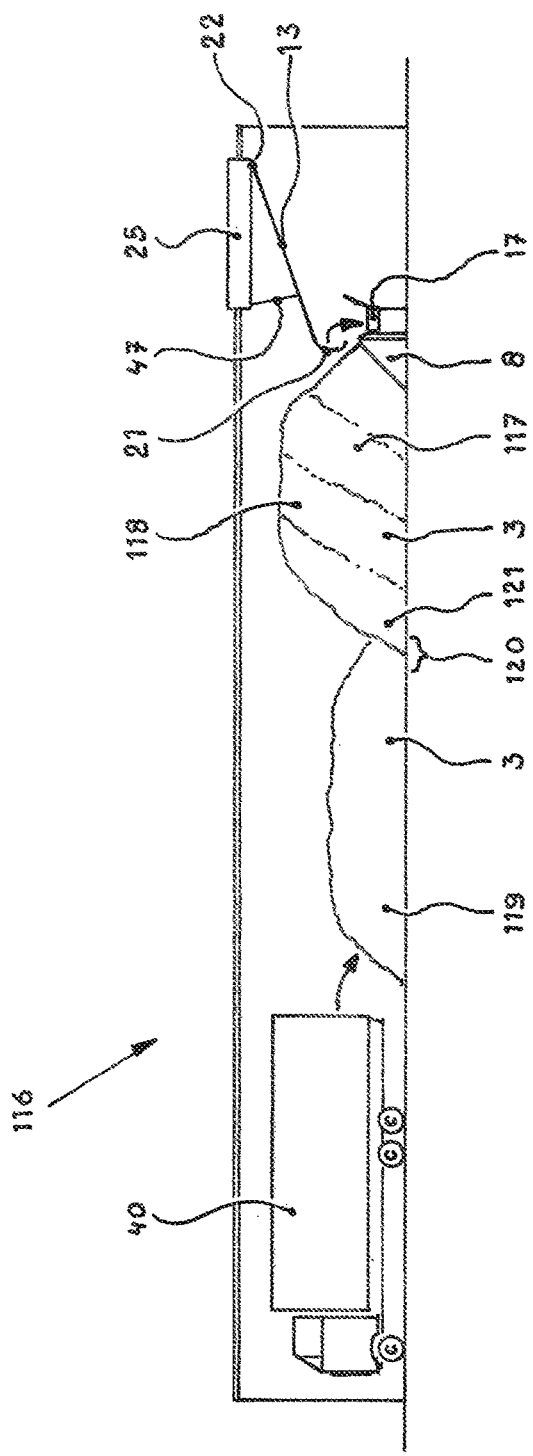
FIG. 14 a longitudinal cross-section through a trench silo corresponding with the FIGS. 3,4,5 that in this exemplary embodiment lacks partition walls.

FIG. 14 shows a trench silo 116, which shows an end wall 8 with an adjoining discharge conveyor 117, but lacks partition walls different from the trench silos 4a;4b;4c;4d.

A transport vehicle 40, in this example a truck, each time successively deposits material to be processed into the silo 116. The scraper 21 performs scraping operations under the control of the control means, whereby the top layer of a stack deposited material is successively displaced in the direction of the end wall 8. Thus, only by way of example, stack 117 may be formed, which for example comprises a sequential loading pattern 118, which is in a very exploratory and schematic manner shown in FIG. 14, in which the results of the corresponding scraping operations are visible. The stack 117 is allowed to be processed after formation, while a further stack 119 is now formed because the truck deposits its cargo at that location. Strictly speaking, there should be a separation between stacks 117 and 119. As shown in FIG. 14, in this embodiment, there is very little overlap of the stacks. The overlapping zone, indicated by 120, may be regarded as a separation in which the interaction of the materials in stacks 117 and 119 is negligible.

The scraper 21, after completing the processing of the material 3 in the stack 117, as previously explained scrapes the material layer by layer on the discharge conveyor 17, until the stack 117 of material 3 is completely discharged. Subsequently, the material of the then finished stack 119 is consecutively scraped therefrom from the current top layer to the position corresponding to the position of the stack 117 in FIG. 14.

In principle, it is possible to let the separation 120 be complete by taking care that the loading of the silo 116 is executed while maintaining a certain distance from the front edge 121 of the stack 117. The disadvantage of this mode of operation is that for this purpose the silo 116 must be longer.

In the situation that a gastight hall is used, use may be made of an inlet with a cell lock, a screw, a cyclone or the like inlet means.

The invention claimed is:

1. An apparatus for processing and mixing and thus homogenizing a mass of a loose or incoherent material, which apparatus comprises:
   a. at least one trench silo having an inlet opening that is freely accessible from the outside for feeding raw, unprocessed material, two mutually parallel side walls, an end wall extending transversely to the sidewalls, and a number of partitions with specified spacings between the side walls distributed over a length of the trench silo between the inlet opening and the end wall, dividing the space bounded by the inlet opening, the side walls and the end wall into a number of compartments comprising an inlet compartment, at least one intermediate compartment and an end compartment, wherein the material is processed, mixed and homogenized in at least the intermediate compartments and the end compartment;
   b. discharge means abutting the end wall for discharge of processed and mixed material;
   c. displacement means for displacing material in steps in the displacement direction from the inlet compartment through all the intermediate compartments and through the partitions to the end compartment, and finally depositing of the processed and mixed material from the end compartment over the end wall consecutively on the discharge means, wherein mixing and homogenization occurs as a result of the displacement of the material, wherein the discharge means comprises a carriage, guide rails supporting the carriage in a longitudinal direction that corresponds with the displacement direction, and a displacement motor, that, when energized, moves the carriage along the guide rails in the longitudinal direction;
   d. a scraper extending transversely to the side walls of the trench silo and fitting between the side walls with some spacing, up and down pivotably supported by the carriage around a pivot axis effected by an active pivoting assembly comprising at least two hinges connected to at least two spaced apart support arms, and a lifting motor which, together with the hinges supports the support arms,
   wherein the scraper, moved with the carriage, every time consecutively scrapes a current top layer with a thickness associated with a vertical dimension of the scraper of a stack of material present in a compartment in the displacement direction and displaces the current top layer to the next compartment or the discharge means,
   wherein the pivot axis is located in the displacement direction downstream of the scraper, such that the scraping is executed by pulling from the current top layer each time, and
   wherein the scraper pivots partly under an influence of gravity and partly under an influence of the active pivoting assembly, wherein pivoting before the scraping in the displacement direction takes place at least partly under the influence of gravity, such that the scraper automatically substantially follows the shape of a free surface of the stack of material; and
   e. control means defining the operation of the apparatus and controlling the displacement means and the active pivoting assembly for the performance of the following steps to be performed in a suitable sequence:
      e1) moving and depositing in a specified pattern the raw or therein worked material deposited in the inlet compartment by repeatedly scraping off a top layer thereof via the first partition to the at least one intermediate compartment;
      e2) processing of said material in said at least one intermediate compartment by resting said material therein for a specified time and optionally treating said material with a liquid and/or gas;
      e3) scraping off the material deposited in the at least one intermediate compartment in the same way layer by layer and displacing it via the second partition to the next compartment, such that the at least one intermediate compartment is emptied;
      e4) re-depositing unprocessed material in the at least one intermediate compartment from the inlet compartment, and so on;
      e5) during continued operation of the apparatus consecutively refilling of a thus emptied compartment with a material from the previous compartment;
      e6) successively depositing of a mass of material in the end compartment and the displacement of said mass of material over the end wall after a period of processing to the discharge means;
      e7) each time successively returning of the scraper in the opposite direction with respect to the displacement direction to a specified position, which returning is executed by the displacement means in a raised position of the scraper, under influence of the action of the active pivoting assembly, such that the scraper is returned unimpeded to the specified position.

2. The apparatus according to claim 1, wherein the partitions are formed by partition walls.

3. The apparatus according to claim 2, wherein above the partition walls and optionally also above the end wall, corresponding curtains are located at least during movements of the carriage, wherein the carriage passes a corresponding curtain in a raised position, and during standstill of the carriage, the corresponding curtain is brought into a lowered position, and wherein the corresponding curtains at least substantially abut to top edges of the partition walls and optionally the end wall.

4. The apparatus according to claim 1, wherein the scraper comprises a generally concave cross-section with a straight lower part and a generally concave upper part connecting thereto under an angle of the order of 90°-140°.

5. The apparatus according to claim 1, wherein pushing means are added to the inlet compartment for displacement in the displacement direction of the material disposed in that compartment.

6. The apparatus according to claim 5, wherein the spacing means for holding the scraper at a specified distance from a bottom of the compartments are part of the active pivoting assembly.

7. The apparatus according to claim 1, wherein a top coating is provided on a bottom of the compartments for preventing of corrosion and/or wear of the bottom.

8. The apparatus according to claim 1, wherein the carriage carries a lifting motor, which, when actuated, winds at least one flexible pulling member, wherein the at least one pulling member is coupled to the support arms, such that the pulling member by actuation of the lifting motor pivots the support arms upwards and lifts the scraper to the raised position, and after removal, or at least reducing, of the actuation of the lifting motor, the scraper under influence of the gravity, reduced by any remaining lifting force with reduced actuation of the lifting motor, descends from the raised position and scrapes the current top layer from the stack of material and during the displacement of the scraper automatically follows the surface of that stack in the displacement direction.

9. The apparatus according to claim 1, wherein the control means are configured for layer by layer stacking in a compartment of material scraped from the previous compartment, so creating a layered loading pattern.

10. A method of processing and mixing and thus homogenizing a mass of a loose or incoherent material, the method comprising:
   a) providing the apparatus of claim 1,
   b) moving and depositing in a specified pattern the raw or therein worked material deposited in the inlet compartment by repeatedly scraping off a top layer thereof via the first partition to the at least one intermediate compartment;
   c) processing of said material in the at least one intermediate compartment by resting said material therein for a specified time and optionally treating said material with a liquid and/or gas;
   d) scraping off the material deposited in the at least one intermediate compartment layer by layer and displacing the material via the second partition to the next compartment, such that the at least one intermediate compartment is emptied;
   e) re-depositing unprocessed material in the at least one intermediate compartment from the inlet compartment, and so on;
   f) during continued operation of the apparatus consecutively refilling of a thus emptied compartment with a material from the previous compartment;
   g) consecutively depositing of a mass of material in the end compartment and displacing said mass of material over the end wall after a period of processing to the discharge means; and
   h) each time consecutively returning the scraper in the opposite direction with respect to the displacement direction to a specified position, wherein returning is executed by the displacement means in a raised position of the scraper, under influence of the action of the active pivoting assembly, such that the scraper is returned unimpeded to the specified position.

11. The method according to claim 10, wherein the control means control the displacement means and the active pivoting assembly so that the scraper in a raised out-of-operation position temporarily is placed in a parking position beyond the discharge means to be subjected to a cleaning operation.

12. The method according to claim 10, wherein the control means control the displacement means and the active pivoting assembly so that the scraper stacks material scraped from a previous compartment layer by layer in a next compartment, so creating a layered loading pattern.

13. The method according to claim 10, wherein the control means control the displacement means and the active pivoting assembly so that the scraper first deposits material scraped from a previous compartment in an inlet zone of a compartment, subsequently deposits material scraped from the previous compartment to the thus formed partial stack, and so on, until the previous compartment is completely emptied, so creating a spatial sequential loading pattern.

14. The method according to claim 10, wherein the control means comprises a processor with software.

* * * * *